Figure 1:
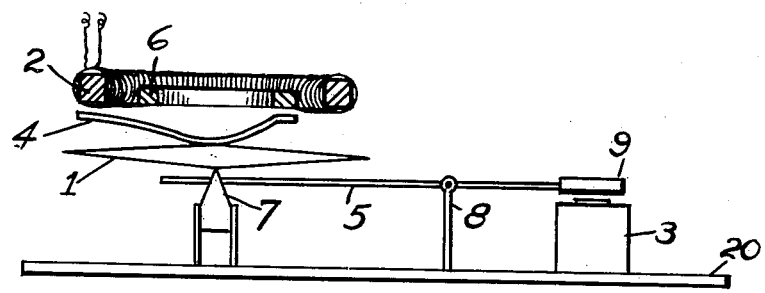

March 31, 1953  F. G. BOUCHER  2,632,959
OIL WELL ORIENTATION DEVICE
Filed May 29, 1948

Frank G. Boucher Inventor
By W. O. Hilman Attorney

Patented Mar. 31, 1953

2,632,959

UNITED STATES PATENT OFFICE 2,632,959

OIL WELL ORIENTATION DEVICE

Frank G. Boucher, Tulsa, Okla., assignor to Standard Oil Development Company, a corporation of Delaware Application May 29, 1948, Serial No. 30,131

1 Claim. (Cl. 33—222)

The present invention relates to an orientation apparatus for use with conventional devices in an oil well in order to determine the azimuthal orientation of the device as it is lowered into the oil well. In particular the apparatus of this invention comprises a simple resistance element in combination with a magnetized compass needle adapted to indicate the orientation of the resistance element as a function of the displacement of a given point of the resistance element relative to the direction indicated by the compass.

At the present time, in the procedure of drilling into the earth to establish the presence of oil deposits, the drill hole often is subjected to a great many testing procedures to obtain as much information as possible as to the nature of strata through which the hole passes, the direction in which the hole is inclined, etc. Thus a great many well logging methods are employed to obtain continuous records of the chemical or physical properties of the earth adjacent the drill hole throughout the depth of the hole. In many of these well logging methods it is important, in order to properly evaluate the records obtained, to know the exact orientation of the well logging instrument at the particular instant a point on the record is recorded. For example, if an instrument is being used which is adapted to record a profile of the drill hole, this information is of limited value unless the orientation of the profiling instrument is known while the profile is being obtained. It is, therefore, the principal object of this invention to provide a simple apparatus which may be operated in conjunction with conventional well logging apparatus so as to indicate the orientation of the apparatus, while the well log is being prepared. It is apparent that the orientation apparatus of this invention may be employed in many other capacities. For example, it is frequently desirable to place a "whipstock" in an oil well to direct the inclination of drilling. When this is done it is necessary to know the orientation of the whipstock in order to insure that the drilling is directed in the proper direction. The apparatus of this invention may be used in conjunction with a whipstock to achieve this objective.

In accordance with this invention, therefore, a resistance element comprising a 360° wound potentiometer is fixed in, or connected with the apparatus or body whose orientation is to be determined. Adjacent the potentiometer is a compass needle to which is connected a metallic spring contact adapted to contact the potentiometer at a point determined by the relative position of the compass needle with respect to the potentiometer. In order that the movements of the compass needle will not be impeded by this contact when orientation readings are not being obtained, the compass needle, or the potentiometer, is arranged on movable pivots so as to permit engagement, or disengagement of the contact from the potentiometer as desired. The movable pivots may be activated by a solenoid operated mechanism to control the engagement of the spring contact with the potentiometer. The apparatus of this invention is, therefore, characterized by extreme simplicity of construction, compactness of size, and flexibility of use.

Figure 2:
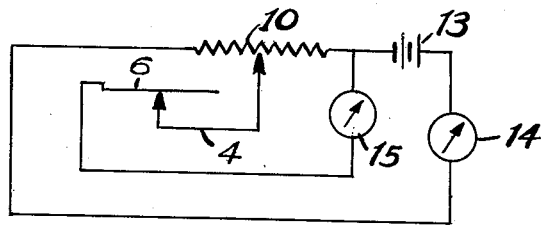
Figure 3:
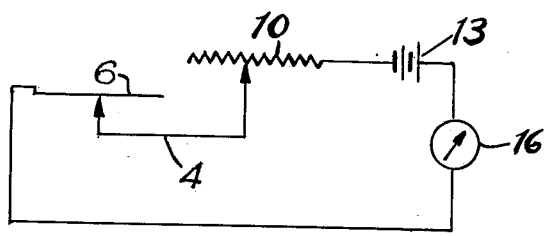

The nature and objectives of this invention will be better understood from a consideration of the following description of a preferred embodiment of the invention. In this description, reference will be made to the accompanying drawings wherein Figure 1 represents a diagrammatical cross section elevation of an embodiment of this invention, and Figures 2 and 3 represent suitable electrical circuits for use in connection with the potentiometer employed in the invention.

Referring to Figure 1, the apparatus illustrated is preferably positioned in a non-metallic housing, or case. For purposes of simplicity, only the lower platform 20 of the case has been shown. It is to be understood that the case to be employed may be of any desired design and is adapted for connection with any apparatus to be oriented in an oil well. Alternatively, the housing about the apparatus shown in Figure 1 may be made an integral part of the apparatus with which the orientation device is to be used. The apparatus illustrated comprises a compass needle 1, a 360° wound potentiometer or resistance element 2, a solenoid coil 3, a spring contact 4, and a lever system 5, adapted to be operated by the solenoid coil 3. The element 2 may be of any desired nature so long as the resistance element is constructed so that the resistance varies around 360°. In other words, the resistance between a selected point on the circumference of the resistance element and a second point on the circumference will be directly proportioned to the circumferential relation of the two points through substantially the full 360° of the circle. Thus the element may, as illustrated, comprise an insulating doughnut on which is wound a wire serving to provide a coil extending in a substantially complete circle. Resistance elements of this general type are commercially available and may be utilized in the apparatus of this invention. Alternatively a suitable resistance element can readily be wound. It is preferred that a fine wire be used so that by moving a point contact around the potentiometer the resistance reading obtained will precisely vary as the contact is moved along the potentiometer. A suitable contact 4 is illustrated in the drawing which preferably comprises a spring element, and which is connected with the compass needle 1. A double armed contact is employed as shown so that the contact may touch not only the potentiometer winding 2, but also an electrically conductive contact ring 6, placed within the potentiometer winding. By this means it is not necessary for any current to flow through the compass needle as the circuit of the potentiometer may be completed from the potentiometer winding through the contact, and back through the contact ring 6. The contact 4 may be insulated from the compass needle. The exact manner in which the electrical circuit is connected to the potentiometer and the contact ring will be brought out in connection with Figures 2 and 3.

The compass needle is pivoted on a support 7, in the conventional manner, permitting the compass needle to freely swing so as to always point in the north-south direction. This pivot may be slidably mounted in the casing base 20 so as to permit the compass needle to be moved toward, or away from the potentiometer. This movement is controlled by the lever 5 pivoted at point 8 and extending over the solenoid coil 3. The lever 5 is preferably made of non-magnetic material, and the solenoid coil 3 is far enough removed from the compass so as not to affect it magnetically. An iron or steel slug 9 may be positioned on the lever 5 over the solenoid coil 3. By this means on activation of the solenoid coil 3, the slug 9, or the lever arm 5 will be pulled toward the coil moving the needle towards the potentiometer, and clamping the spring contact 4 against the potentiometer winding 2 and against the contact ring 6. The electrical circuit connected with the solenoid coil 3 has not been illustrated. The circuit may simply consist of a battery and a switch to supply direct current to activate the solenoid coil as desired. If desired the switch may be operated by a cycling motor or equivalent means to cause automatic periodic activation of the solenoid coil. In any case each time the solenoid coil is activated, the contact 4 will be brought against the resistance element 2 to provide an orientation determination.

Consequently, as described, the apparatus of Fig. 1 consists of a compass needle to which a spring contact is connected which is placed adjacent to a potentiometer winding and is provided with means for moving the spring contact into and out of contact with the potentiometer. Since the potentiometer winding is maintained in an azimuthal orientation dependent upon the position of the apparatus to be oriented, and since the contact and compass needle are maintained in a north-south direction, it is apparent that on movement of the compass needle towards the potentiometer to cause the contact to touch the potentiomeer, the relative orientation of the potentiometer relative to the compass needle may be determined by a resistance reading of the potentiometer. In order to accomplish this, any desired type of electrical circuit may be used. For example, the electrical circuit of either Figure 2, or Figure 3, may be employed. In these figures the number 10 designates the 360° wound potentiometer. The numeral 4 identifies the spring contact arm 4 of Figure 1 which is adapted to establish contact between a particular point of the potentiometer winding 10 and the contact ring 6 of Figure 1 as indicated by numeral 6 in Figures 2 and 3. The potentiometer is connected in series with a battery 13 in both figures. In Figure 2, the electrical circuit leads from the potentiometer, through a battery 13, through an electrical meter 14, back to the other side of the potentiometer winding 10. One side of the potentiometer 10 is also connected in an electrical circuit through the electrical meter 15 to the contact ring 6. By this means the balance of current or voltage indicated by meters 14 and 15 will be a function of the position of the potentiometer contact 4 along the potentiometer winding 10. Since the position of the contact 4, against the potentiometer winding 10 is a function of the directional orientation of the potentiometer 10, the readings of instruments 14 and 15 will on proper calibration indicate the orientation of the potentiometer 10.

Figure 3 illustrates an even simpler circuit which may be used. In this figure an electrical connection is made only to one end of the potentiometer 10. An electrical circuit thus runs from one end of the potentiometer 10 through battery 13, through meter 16, through the contact ring 6, and back through the contact 4 to a particular point on the potentiometer 10. The amount of current or voltage registered by the meter 16 will be a function of the position of the contact 4 against the potentiometer 10 so that similarly an orientation reading may be obtained from the meter 16.

It is apparent that many other electrical circuits may be employed to suitably indicate the position of the contact 4 with respect to the potentiometer 10. It is apparent also that the meters may be suitably calibrated in the circuit shown, so as to directly indicate the azimuthal orientation of the potentiometer. It is also desirable in many applications, such as in well logging applications, to use a recording galvanometer for the meters in the circuits described. Suitable recording galvanometers are well known to the art and are used for many applications in oil equipment, so for that reason a suitable galvanometer will not be fully described. Such a galvanometer is often provided with a mirror mounted on the moving coil of the galvanometer adapted to reflect a light beam onto a sensitized paper record, so as to provide a permanent record of the fluctuations of the galvanometer.

Having now fully described this invention, what is claimed is:

A remote reading orientation apparatus comprising in combination a vertically movable pivot support, a pivot point carried by said support, a magnetic compass element pivotally mounted on the pivot point of said support, a circular resistance element positioned adjacent said magnetic element and positioned concentrically with respect to the said pivot point, said resistance element being so constructed that the resistance between a selected point on the circumference thereof and a second point on said circumference will be proportional to the circumferential relation of the two points, an electrically conductive contact ring positioned adjacent said circular resistance element and positioned concentrically therewith, an elongated spring contact member fixed to said magnetic element having opposed ends at opposite sides of the pivot point and having one end adapted to make electrical contact with said circular resistance element and having the opposite end adapted to make electrical contact with said conductive ring, remotely operable means for effecting vertical movement of said pivot support to thereby move said contact member into and out of contact with said contact ring and said resistance element, electrical circuit elements connected to said resistance element and said contact ring adapted to pass an electrical current through each of said elements when said contact member contacts the resistance element and the contact ring, and means in said electrical circuit to determine the electrical resistance of said resistance element.

FRANK G. BOUCHER.

REFERENCES CITED

The following references are of record in the file of this patent:

UNITED STATES PATENTS

| Number | Name | Date |
|---|---|---|
| 385,043 | Chase | June 26, 1888 |
| 1,146,486 | Durr | July 13, 1915 |
| 1,924,071 | Laudermilk | Aug. 22, 1933 |
| 2,120,771 | Thompson | June 14, 1938 |
| 2,330,661 | Arey et al. | Sept. 28, 1943 |

FOREIGN PATENTS

| Number | Country | Date |
|---|---|---|
| 412,465 | Germany | Aug. 26, 1925 |